United States Patent [19]

Goerne

[11] Patent Number: 4,724,315

[45] Date of Patent: Feb. 9, 1988

[54] OPTICAL RECEIVER

[75] Inventor: Jan Goerne, Munich, Fed. Rep. of Germany

[73] Assignee: Siemens Aktiengesellschaft, Berlin and Munich, Fed. Rep. of Germany

[21] Appl. No.: 938,142

[22] Filed: Dec. 4, 1986

[30] Foreign Application Priority Data

Dec. 16, 1985 [DE] Fed. Rep. of Germany ....... 3544442

[51] Int. Cl.$^4$ .................... H01J 40/14; H03F 17/00
[52] U.S. Cl. .................. 250/214 A; 307/311; 330/59; 330/100; 330/110; 330/259; 330/260; 330/308; 455/619
[58] Field of Search .............. 330/59, 97, 99, 100, 330/110, 259, 260, 308; 250/214 A; 307/311; 455/619

[56] References Cited

PUBLICATIONS

Mennie, "Fiber–Optics Detector and Amp on One Chip Fight REI and EMI", *Electronic Design* 21, Oct. 11, 1979, pp. 29, 30.

*Primary Examiner*—James B. Mullins
*Attorney, Agent, or Firm*—Hill, Van Santen, Steadman & Simpson

[57] ABSTRACT

An optical receiver comprises a plurality of sequentially-connected, symmetrically-constructed operational amplifiers having two complementary outputs. For the determination of the operating points and for suppressing the offset voltages, one output of each amplifier is connected by way of a negative feedback path to the second input of the first amplifier, whereas the useful signal is supplied to the first input of the first amplifier.

8 Claims, 1 Drawing Figure

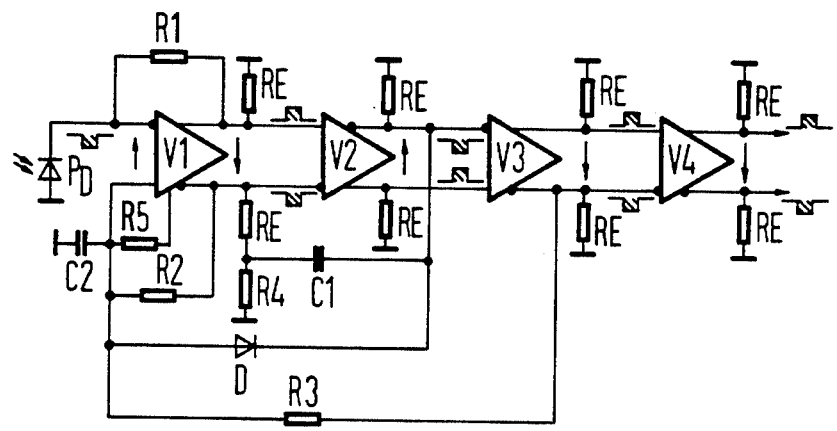

OPTICAL RECEIVER

BACKGROUND OF THE INVENTION

1. Field of the Invention

The present invention relates to an optical receiver comprising a PIN photodiode as a receiving element for optical signals of a fiber optic communications transmission link and having a following transimpedance amplifier for conversion of the photocurrent output by the PIN diode into an evaluatable voltage.

2. Description of the Prior Art

The principle of an optical receiver constructed in such a manner is disclosed, for example, in the article "Grundlagen der elektro-optischen Signalueber-tragung" in telecom report, Vol. 6, 1983, supplement "Nachrichtenuebertragung mit Licht", pp. 21–27. Numerous modifications of the optical receivers constructed in this manner are commercially available. There are extremely expensive, complete optical receivers having high sensitivity. In addition there are optical receivers which are fashioned as preamplifiers having small gain and wherein considerable expense is required in order to arrive at an evaluatable signal, particularly given optical pulses having a high bit rate. All of the optical receivers available in the market place form a structural unit with a plug structure adapted thereto, An adaptation to different types of plug structures involves considerable added expense. A further disadvantage of the known optical receivers is that an A.C.-oriented coupling is preferred in order to avoid drift problems in the receivers. An A.C.-oriented coupling between the individual receiver stages, however, is disadvantageous for a data traffic having a quiescent condition, since undesired transient states can occur.

SUMMARY OF THE INVENTION

The object of the present invention is to provide an optical receiver of the type generally set forth above which is universally useable and can be manufactured in a cost-effective manner.

For an optical receiver of the aforementioned type, the above object is achieved, according to the present invention, in that the trans-impedance amplifier is constructed as a symmetrically-constructed emitter-coupled logic (ECL) operational amplifier having two complementary outputs which, in addition to comprising a degenerative feedback path, comprises an additional negative feedback branch, and in that the trans-impedance amplifier is followed by two voltage amplifiers which are likewise constructed as symmetrical ECL operational amplifiers having two complementary inputs, whereby the negative output voltage of the second voltage amplifier is fed to the non-inverting input of the trans-impedance amplifier via a feedback path.

An optical receiver constructed in accordance with the present invention is universally employable regardless of the plug structure since it does not form a unit therewith. It is composed of commercially-available ECL components and can therefore be manufactured inexpensively. The coupling between the individual stages is D.C.-oriented, so that a great advantage for data traffic having pauses between the individual data packets occurs. As a result of the negative feedback, no drift problems occur with an optical receiver constructed in accordance with the present invention.

An advantageous embodiment of the optical receiver of the present invention is characterized in that the negative output of the first voltage amplifier is fed to the non-inverting input of the trans-impedance amplifier by way of a diode which is inhibited in the quiescent condition of the receiver.

It is thereby achieved that the negative feedback circuit of the first voltage amplifier is effective only given greater optical signals, whereby the dynamics of the optical receiver are increased.

BRIEF DESCRIPTION OF THE DRAWINGS

Other objects, features and advantages of the invention, its organization, construction and operation will be best understood from the following detailed description, taken in conjunction with the accompanying drawing, on which there is a single figure showing a schematic circuit diagram of the optical receiver of the present invention.

DESCRIPTION OF THE PREFERRED EMBODIMENTS

The optical receiver of the present invention is essentially composed of a PIN diode $P_D$ and of four sequentially-connected amplifiers V1–V4. The amplifiers V1–V4 are symmetrically-constructed ECL operational amplifiers having two complementary outputs. Prescribed by the ECL technology, each output of the amplifier has an emitter resistor RE connected to ground potential.

The incoming light signals are converted into a photo current by a photodiode $P_D$, this photo current being converted by the first amplifier V1, which works as a trans-impedance amplifier, into a corresponding voltage which is then available for further amplification having amplifiers V2–V4. Whereas the amplifier V1, having a resistor R1 connected in a degenerative feedback path, operates as a trans-impedance amplifier having the lowest possible input resistance, the amplifiers V2 and V3 are exclusive voltage amplifiers. The amplifier V4 sees to an additional voltage gain but, since it is connected as a comparator, it predominately serves as the evaluation stage of the optical receiver.

The coupling between the individual amplifiers of the optical receiver occurs in a D.C.-oriented manner since each output of the amplifier is respectively directly connected to the input of the following amplifier. The useful signal to be evaluated is supplied to the inverting input of the amplifier V1. For the purpose of determining the operating points of the trans-impedance amplifier V1, the non-inverting input is connected by way of the resistor R5 to a reference voltage source of the trans-impedance amplifier V1. The negated output of the amplifier V1 is connected by way of a resistor R2 to the non-inverting input of the amplifier V1 so that a negative feedback occurs. Further, the negated output of the amplifier V3 is connected via a resistor R3 to the non-inverting input of the trans-impedance amplifier V1. What is achieved by these two negative feedback paths comprising the resistors R2 and R3 is that the outputs of the voltage amplifier V3 lie in the region of the ECL level and the effect of the offset voltage is reduced.

The negated output of the voltage amplifier V2 is connected to the non-inverting input of the trans-impedance amplifier V1 by way of a diode D. This connection forms the third negative feedback path. This feedback path comprising the diode D, however, does not take effect unless great optical signals are received, i.e. those signals over a predetermined magnitude. As a result of the positive feedback between the negated output of the voltage amplifier V2 and the inverting input of the voltage amplifier V2 by way of a capacitor C1 and the emitter resistor R3 in combination with a resistor R4, whose value of resistance is greater up to a factor of 10 than the value of the resistance of the emitter resistor RE, the desired polarity is defined at the output of the voltage amplifier V2. What is achieved as a result of this positive feedback branch, in particular, is that the absolute voltage value at the negated output of the voltage amplifier V2 in the quiescent condition of the optical receiver is greater than the absolute value of the voltage of the non-inverted output of the voltage amplifier V2. In this manner, the quiescent condition is unambiguously defined, so that the diode D is inhibited in the quiescent condition of the optical receiver. The positive feedback branch is designed such that the diode D also remains inhibited for low-level optical signals.

It derives therefrom that the control of the output voltage given low optical signals occurs only by way of the negative feedback branches comprising the resistors R2 and R3 and the control by way of the third negative feedback branch comprising the diode D only takes effect given large optical signals in order to prevent output voltages from lying outside of the operating range of the operational amplifiers.

The capacitor C1 essentially serves for the balancing of the capacitance of the diode D and of the large resistor R4 and thus improves the properties of the amplifier in the region of high bit rates since it improves the rise time of the overall optical receiver. The capacitor C2 also serves the purpose of improving the properties of the optical reception in the range of high frequencies, the capacitor C2 serving as a coupling element for steep pulse edges within the negative feedback branches.

In order to keep the input offset current of the trans-impedance amplifier V1 as low as possible, the resistors R1, R2, R3 and R5 are dimensioned such that the overall value of the resistance of the parallel connection of the resistors R2, R3 and R5 is roughly identical to the value of resistance of the degenerative feedback resistor R1.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An optical receiver comprising:
a PIN photodiode for receiving and converting an optical signal into a photo current;
a trans-impedance amplifier for converting the photo current into an evaluatable voltage, said trans-impedance amplifier comprising a symmetrically-constructed first ECL operational amplifier including first and second inputs and first and second complementary outputs, said first input connected to said photodiode, a degenerative feedback path connecting said first output to said first input, and a negative feedback path connecting said second output to said second input;
a symmetrically-constructed second ECL operational amplifier including first and second inputs and first and second complementary outputs, said first input connected to said first output of said first ECL operational amplifier, and said second input connected to said second output of said first ECL operational amplifier;
a symmetrically constructed third ECL operational amplifier including first and second inputs and first and second complementary outputs, said first input connected to said first output of said second ECL operational amplifier, said second input connected to said second output of said second ECL operational amplifier, and a negative feedback path connected between said second output and said second input of said first ECL operational amplifier.

2. The optical receiver of claim 1 wherein:
said degenerative feedback path comprises a first resistor;
said negative feedback path connecting said second output to said second input of said first ECL operational amplifier comprises a second resistor; and
said negative feedback path connecting said second output of said third ECL operational amplifier to said second input of said first ECL operational amplifier comprises a third resistor.

3. The optical receiver of claim 2, and further comprising:
a diode connected between said first output of said second ECL operational amplifier and said second input of said first ECL operational amplifier, said diode being inhibited in the quiescent condition of said receiver.

4. The optical receiver of claim 3, and further comprising:
fourth and fifth resistors connected in series between ground potential and said second input of said second ECL operational amplifier and having a junction therebetween; and
a capacitor connected between said first output of said second ECL operational amplifier and said junction.

5. The optical receiver of claim 4, wherein:
the resistance value of said fourth resistor is greater than the resistance value of said fifth resistor up to a factor of 10.

6. The optical receiver of claim 1, and further comprising:
a decoupling capacitor connected between said second input of said first ECL operational amplifier and ground potential.

7. The optical receiver of claim 1, and further comprising:
a resistor connected between said second input of said first ECL operational amplifier and a reference voltage source of that amplifier for determining the operating points of said trans-impedance amplifier.

8. The optical receiver of claim 1, and further comprising:
a symmetrically-constructed fourth ECL operational amplifier including first and second inputs and first and second complementary outputs, said first input connected to said first output of said third ECL operational amplifier, said second input connected to said second output of said third ECL operational amplifier, and said fourth ECL operational amplifier operating as a comparator and serves as an evaluation stage.

* * * * *